Patented July 21, 1925.

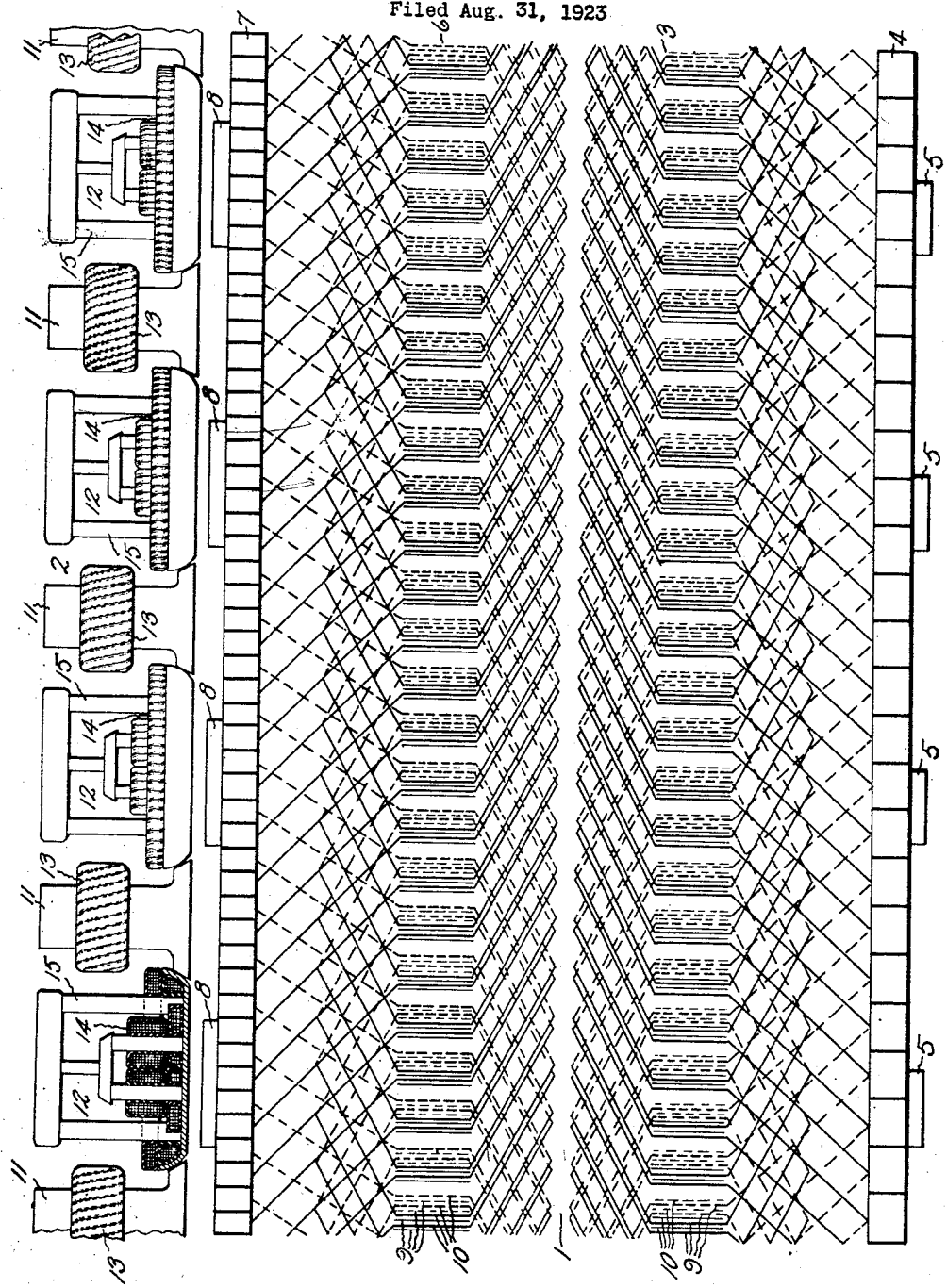

1,546,869

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

DYNAMO-ELECTRIC MACHINE.

Application filed August 31, 1923. Serial No. 660,418.

*To all whom it may concern:*

Be it known that I, CHARLES P. STEINMETZ, a citizen of the United States, residing at Schenectady, in the county of Schenectady, State of New York, have invented certain new and useful Improvements in Dynamo-Electric Machines, of which the following is a specification.

My invention relates to dynamo electric machines of the commutator type and is particularly applicable to such dynamo electric machines designed for operation at high voltages. It has for its object to improve the commutation of such machines.

One of the limiting features in the design of commutating machines, such as direct current generators and motors, synchronous converters, synchronous rectifiers, and the like, is the self induction of commutation, which limits the permissible voltage between commutator segments. This voltage is limited to a magnitude of about 2 volts, if no means are provided to balance the self induction of commutation. It has been the practice heretofore to balance this self induction by an opposing voltage induced by a commutating flux, which may be produced by commutating poles, compensating windings, shifting the brushes to the fringe of the next pole, and the like. This has resulted in increasing the limit of the voltage between commutator segments to about 20 volts. Such methods of balancing the self induction of commutation are limited by the impossibility of getting complete balancing under all changing conditions of load and saturation, and the limit is reached when the unavoidable unbalanced self induction reaches such a magnitude that it affects commutation.

In accordance with my invention, I eliminate the self induction of commutation by employing a short circuited secondary to the armature coil undergoing commutation. In order to accomplish this, the armature is wound with a main winding and an auxiliary winding, the conductors of the main winding being connected to a commutator and the conductors of the auxiliary winding being connected to a separate auxiliary commutator. Coils of the auxiliary winding are short circuited when commutation of corresponding coils of the main winding takes place, and are kept short circuited until a long enough time after commutation of said coils of the main winding has taken place for the current, induced in these coils of the auxiliary or neutralizing winding by the reversal of the current in said coils of the main winding, to die out, whereupon the short circuit is opened. My arrangement does not depend upon any balancing of two opposed electromotive forces, but merely requires that the coils of the auxiliary winding be short circuited for a sufficient length of time for the induced current in said coils of the auxiliary winding, which makes the reversal of current in the corresponding coils of the main winding non-inductive, to completely die out under all circumstances before the short circuit opens.

For a better understanding of my invention, reference may be had to the following description taken in connection with the accompanying drawing in which the single figure shows diagrammatically a dynamo electric machine embodying my invention.

Referring to the drawing, there is shown an armature 1 having a field structure 2. The armature is provided with a main armature winding 3 connected to a commutator 4 on which brushes 5 bear and an auxiliary winding 6 connected to a commutator 7 on which the brushes 8 bear. The commutators 4 and 7 may be arranged on opposite sides of the armature or on the same side. The brushes 5 of the main winding conduct the load current produced by the main armature winding 3 away from the machine and the auxiliary brushes 8 successively short circuit the coils of the auxiliary winding 6 when commutation of the corresponding coils of the main winding takes place and keep said coils of the auxiliary winding short circuited until a long enough time after commutation of said coils of the main winding has taken place for the current, induced in these coils of the auxiliary or neutralizing winding by the reversal of the load current in said coils of the main winding, to die out, whereupon the short circuit of said coils of the auxiliary winding is opened. For the sake of simplicity and to make it possible to trace the circuit of the windings 3 and 6, they are shown in the drawing side by side. In the actual construction of the machine, however, the conductors of the windings 3 and 6 are wound so as to have maximum mutual inductance between them. This is accomplished by winding the conductors of both windings in the same slots of the machine. The portions of the conductors of the main winding located in the slots are indicated by the numeral 9, and the portions of the auxiliary winding located in the slots are indicated by the numeral 10. In the lower portion of the figure of the drawing in which the complete circuit of the main winding 3 is shown, only the portions 10 of the conductors of the auxiliary winding which are located in the slots are shown, whereas in the upper portion of the figure where the complete connections of the auxiliary winding 6 are shown, only those portions 9 of the main winding are indicated which are located in the slots.

The main winding 3 is a wave winding and for the sake of simplicity is shown as having two turns per coil and one coil per slot and of full pitch. In order to obtain a high voltage the number of turns per coil would in practice be of a much greater number and would be chosen in accordance with the well known principles of design of high voltage machines. The number of coils per slot and the pitch may also be suitably chosen. The auxiliary winding 6 is similar to the main winding, with the same number of turns and coils. The main winding, however, is a closed coil winding, but the auxiliary winding is an open coil one, so that the number of commutator bars in the auxiliary commutator 7 is twice that of the main commutator 4. By making the auxiliary winding an open coil winding, the maximum potential on the auxiliary commutator 7 is that between adjacent bars, whereas if the auxiliary winding were a closed coil winding, the maximum voltage on the commutator would be the voltage of the machine and the same as that between the brushes 5 on the main commutator 4. Each conductor of main armature winding 3 is wound closely adjacent in its slot to a corresponding conductor of the auxiliary winding 6, so that the mutual inductance between corresponding coils of both windings is a maximum. The auxiliary brushes 8 are so arranged on the commutator 7 that when commutation of a coil of the main winding 3 takes place, the corresponding coil of the auxiliary winding 6, which is placed inductively with respect to this coil of the main winding is short circuited and is kept short circuited during commutation of this coil and for a sufficiently long time thereafter until the current induced in the coil of the auxiliary winding by the reversal of load current in the main winding has died out. The corresponding commutator segment of commutator 7 then moves out from under brush 8 and opens the short circuit. Commutation of the main winding takes place by the segments of commutator 4 moving into contact with brushes 5. In practice I find it expedient to have the brushes 8 come in contact with the proper segment of commutator 7 immediately before the corresponding segment of commutator 4 reaches a brush 5, thereby insuring the proper closing of the short circuit of the coils of winding 6 and immediately before commutation of the main winding takes place.

As is well understood, the current induced in the short circuited coils of the auxiliary winding is twice that of the current flowing in the main winding, and thereby makes the reversal of the load current in the coils of the main winding 3 non-inductive. The induced current in said coils of the auxiliary or neutralizing winding then dies out in the resistance of this winding, which is preferably high, so that at the moment when the short circuit is opened, there is no current in these coils of the winding. The voltage which has to be commutated in the load or main winding is therefore merely the resistance drop of the two windings, which is easily taken care of.

The field pole structure consists of main poles 11 having a small pole arc of 40 to 60 per cent. and commutating poles 12. The main poles 11 have field windings 13 and the commutating poles 12 have windings 14 which supply a flux to compensate the armature reaction and also to supply a commutating field to take care of the voltage of the main winding which must be commutated. The commutating poles are also provided with a magnetic shield 15 to prevent stray fields from entering the armature in the commutating zone. This magnetic shield is fully disclosed in an application of R. E. Doherty, Serial No. 676,151 filed November 21, 1923.

If desired, this auxiliary winding may be a closed coil winding. The main and auxiliary winding although shown as wave or series windings, may be made as lap or multiple windings. Wave windings are preferable however when my invention is used in high voltage machines since less coils are necessary and no equalizers are necessary.

I desire it to be understood that my invention is not limited to the particular construction shown and described, and I aim in the appended claims to cover all modifications which do not depart from the spirit and scope of my invention as set forth in the accompanying claims.

What I claim as new and desire to secure by Letters Patent of the United States, is:—

1. In a dynamo electric machine, an armature, a main armature winding thereon, a commutator to which said winding is connected, an auxiliary armature winding on said armature, an auxiliary commutator to which said auxiliary winding is connected, and means for short-circuiting coils of said auxiliary winding when commutation of corresponding coils of said main winding takes place and keeping said coils of said auxiliary winding short-circuited during commutation of said coils of said main winding and until the current induced in said coils of said auxiliary winding by the reversal of load current in said corresponding coils of the main winding has died out.

2. In a dynamo electric machine, an armature, a main armature winding thereon, a commutator to which said winding is connected, an auxiliary armature winding on said armature, an auxiliary commutator to which said auxiliary winding is connected, the conductors of said main and auxiliary windings being wound so as to have maximum mutual inductance between them, means for short-circuiting coils of said auxiliary winding when commutation of corresponding coils of said main winding takes place and keeping said coils of said auxiliary winding short-circuited during commutation of said coils of said main winding and until the current induced in said coils of said auxiliary winding by the reversal of said load current in said corresponding coils of the main winding has died out.

3. In a dynamo electric machine, an armature, a main armature winding thereon, a commutator to which said winding is connected, an auxiliary armature winding on said armature, an auxiliary commutator to which said auxiliary winding is connected, the conductors of said main armature winding being placed closely adjacent to the corresponding conductor of said auxiliary winding and in the same slot so as to have maximum mutual inductance between them, means for successively short-circuiting the coils of said auxiliary winding when commutation of the adjacent coils of said main winding takes place and keeping said coils of the auxiliary winding short-circuited during commutation of said coils of said main winding and until the current induced in said short-circuited coils of the auxiliary winding by the reversal of load current in said coils of the main winding has died out.

4. In a dynamo electric machine, an armature, a main armature winding thereon, a commutator to which said winding is connected, an auxiliary armature winding on said armature, an auxiliary commutator to which said auxiliary winding is connected, the conductors of said armature windings being wound so as to have maximum mutual inductance between them, brushes on said auxiliary commutator for short-circuiting coils of said auxiliary winding when commutation of corresponding coils of said main winding takes place and keeping said coils of said auxiliary winding short-circuited during commutation of said coils of said main winding until the current induced in said coils of said auxiliary winding by the reversal of said load current in said coils of the main winding has died out.

5. In a dynamo electric machine, an armature, a main armature winding thereon, a commutator to which said winding is connected, an auxiliary armature winding on said armature, an auxiliary commutator to which said auxiliary winding is connected, the conductors of said main winding being placed closely adjacent to the corresponding conductors of said auxiliary winding and in the same slot so as to have maximum mutual inductance between them, brushes on said auxiliary commutator for successively short-circuiting the coils of said auxiliary winding when commutation of the adjacent coils of said main winding takes place and keeping said coils of said auxiliary winding short-circuited during commutation of said coils of the main winding and until the current induced in said coils of the said auxiliary winding by the reversal of load current in the coils of the main winding has died out.

6. In a dynamo electric machine, an armature, a main armature winding thereon, a commutator to which said winding is connected, an auxiliary armature winding of the open coil type on said armature, an auxiliary commutator to which said auxiliary winding is connected having twice as many segments as said first mentioned commutator, and means for short-circuiting coils of said auxiliary winding when commutation of corresponding coils of said main winding takes place and keeping said coils of said auxiliary winding short-circuited during commutation of said coils of said main winding and until the current induced in said coils of said auxiliary winding by the reversal of load current in said coils of the main winding has died out.

7. In a dynamo electric machine, an armature, a main armature winding thereon, a commutator to which said winding is connected, an auxiliary armature winding of the open coil type on said armature, an auxiliary commutator to which said auxiliary winding is connected having twice as many segments as said first mentioned commutator, the conductors of said main and auxiliary windings being wound so as to have maximum mutual inductance between them, and means for short-circuiting coils of said auxiliary winding when commutation of corresponding coils of said main winding takes place and keeping said coils of said auxiliary winding short-circuited during commutation of said coils of said main winding and until the current induced in said coils of said auxiliary winding by the reversal of said load current in said coils of the main winding has died out.

8. In a dynamo electric machine, an armature, a main armature winding thereon, a commutator to which said winding is connected, an auxiliary armature winding of the open coil type on said armature, an auxiliary commutator to which said auxiliary winding is connected having twice as many segments as said first mentioned commutator, the conductors of the main winding being placed closely adjacent to the corresponding conductors of said auxiliary winding and in the same slot so as to have maximum mutual inductance between them, means for successively short-circuiting the coils of said auxiliary winding when commutation of the adjacent coils of said main winding takes place and keeping said coils of the auxiliary winding short-circuited during commutation of said coils of said main winding and until the current induced in said short-circuited coils of the auxiliary winding by the reversal of load current in said coils of the main winding has died out.

9. In a dynamo electric machine, an armature, a main armature winding thereon, a commutator to which said winding is connected, an auxiliary armature winding of the open coil type on said armature, an auxiliary comutator to which said auxiliary winding is connected having twice as many segments as said first mentioned commutator, the conductors of said armature windings being wound so as to have maximum mutual inductance between them, brushes on said auxiliary commutator for short-circuiting coils of said auxiliary winding when commutation of corresponding coils of said main winding takes place and keeping said coils of said auxiliary winding short-circuited during commutation of said coils of said main winding until the current induced in said coils of said auxiliary winding by the reversal of said load current in said coils of the main winding has died out.

10. In a dynamo electric machine, an armature, a main armature winding thereon, a commutator to which said winding is connected, an auxiliary armature winding of the open coil type on said armature, an auxiliary commutator to which said auxiliary winding is connected having twice as many segments as said first mentioned commutator, the conductors of said main winding being placed closely adjacent to the corresponding conductors of said armature winding and in the same slot so as to have maximum mutual inductance between them, brushes on said auxiliary commutator for successively short-circuiting the coils of said auxiliary winding when commutation of the adjacent coils of said main winding takes place and keeping said coils of said auxiliary winding short-circuited during commutation of said coils of the main winding and until the current induced in said coils of the said auxiliary winding by the reversal of load current in the coils of the main winding has died out.

In witness whereof, I have hereunto set my hand this 30th day of August 1923.

CHARLES P. STEINMETZ.